United States Patent Office 3,193,510
Patented July 6, 1965

3,193,510
ALKYLSULFATE SOLUTIONS
Manuel M. Baizer, St. Louis, Mo., assignor to Monsanto Company, a corporation of Delaware
No Drawing. Filed Oct. 23, 1961, Ser. No. 147,070
7 Claims. (Cl. 252—363.5)

The present invention relates to solutions or organic materials in quaternary ammonium alkylsulfates and water.

An object of the invention is to prepare concentrated aqueous solutions of organic materials, particularly of sparingly soluble or hydrophobic organic compounds. It is a further object of the invention to provide solutions of various organic compounds which are suitable for conducting various reactions of such compounds. An additional object of the invention is to provide a method of dissolving sparingly soluble organic compounds in water.

For many purposes it is desirable to prepare concentrated aqueous solutions of organic compounds. Thus, such solutions of organic compounds are useful for conducting Canizzaro's reaction of aldehydes, various types of homogeneous polymerization procedures, and many acidic and caustic hydrolysis procedures. Such solutions are also useful as media for crystallization and purification procedures, for selective extraction and purification procedures, and for various other procedures for the isolation of organic compounds.

In the present invention, quaternary ammonium alkylsulfates are employed as solubilizing agents to obtain concentrated solutions of organic compounds useful for the foregoing purposes. The water-soluble hygroscopic quaternary ammonium alkylsulfates in general are suitable for forming concentrated aqueous solutions of sparingly soluble organic compounds. The quaternary ammonium cation in such compounds is represented as follows:

$$^{+}NR_n$$

where $n$ is an integer from 2 to 4 representing the number of R's required to provide four valence bonds for the nitrogen and the R's are organic radicals having from 1 to 3 valence bonds to the nitrogen, provided that at least one R has a single valence bond to the nitrogen, and the R's are selected from the group consisting of aryl radicals, alkyl radicals, omega-hydroxy alkyl radicals, divalent organic radicals forming a heterocyclic ring with the nitrogen atom, and trivalent organic radicals forming a heterocyclic ring with the nitrogen atom. In general the quaternary ammonium ion should have substituents of sufficient size to provide a fairly strong hydrophobic group, but not so large as to greatly impair the solubility of the salt. It is preferred that the quaternary ammonium ion have more than 6 but not more than 20 carbon atoms, usually no more than 15 carbon atoms and no more than 6 carbon atoms in a single radical. The alkylsulfate portion of the salt can also vary, alkyl groups of no more than 8 carbon atoms being most useful; as a matter of fact, the methylsulfate and the ethylsulfate are the most convenient for use because of the greater availability of source materials for their preparation. Among the useful alkylsulfates are aliphatic and heterocyclic quaternary ammonium salts, i.e. the tetraalkyl ammonium or the tetraalkanol ammonium salts or mixed alkyl alkanol ammonium salts such as the alkyl trialkanol ammonium, the dialkyldialkanol ammonium, the alkanol trialkyl-ammonium or the N-heterocyclic, N-alkyl ammonium or N-heterocyclic, N,N-dialkyl ammonium salts of alkylsulfates. It is also possible to have aryl substituents on the nitrogen atom, although their size will ordinarily dictate that only one aryl substituent be present on the ammonium nitrogen, and that the other substituents be alkyl groups or other groups containing a limited number of carbon atoms. Examples of quaternary ammonium alkylsulfates useful in the present invention are, tetraethylammonium methylsulfate, tetraethylammonium ethylsulfate, tetraethylammonium butylsulfate, tetramethylammonium hexylsulfate, N,N-dimethylpiperidinium methylsulfate, tetrabutylammonium ethylsulfate, tetrapyropylammonium methylsulfate, N-ethylpyridinium methylsulfate, phenyltrimethylammonium methylsulfate, tetraethanolammonium methylsulfate, tetrabutanolammonium methylsulfate, tetrapentylammonium methylsulfate, tetrapentanolammonium methylsulfate, methyltriethylammonium methylsulfate, trimethylethylammonium hexylsulfate, triethylpentylammonium hexylsulfate, trimethylethanolammonium methylsulfate, N-methylpyrrolidinium methylsulfate, N,N-diisopropylmorpholinium methylsulfate, etc.

In general it is preferred that the ammonium cation be completely hydrocarbon except for the ammonium nitrogen, although the hydroxy alkyl substituents are also very useful in the ammonium cations. The tetraalkylammonium cations are in general very suitable and convenient for use, especially the ethyl, n-propyl, isopropyl and various isomeric butyl radicals; the pentyl, hexyl, heptyl and octyl radicals can also be employed, provided they are selected so that the total number of carbon atoms in the cation does not become too large. The tetramethylammonium cation, while being useful to some extent in the present invention, is far inferior in its solubilizing power compared to the higher tetraalkylammonium cations; this is perhaps related to the fact that the tetramethylammonium methylsulfate is non-hygroscopic, which is in sharp contrast to the hygroscopicity of the higher tetraalkylammonium methylsulfates. While the alkyl sulfate portions of the salt employed in the present invention can vary widely, a methylsulfate and/or ethylsulfate will generally be used; however, normal propylsulfate, isopropylsulfate, n-butylsulfate, isobutylsulfate, pentylsulfates, hexylsulfates, heptylsulfates and octylsulfates can also be employed and it may be convenient at times to use one of these alkylsulfates rather than the generally readily available and very suitable methyl or ethylsulfates. The quaternary ammonium alkylsulfates employed herein are often prepared by reacting the appropriate dialkylsulfates with the required tertiary amine, for example tributylmethylammonium methylsulfate is prepared by reacting tributylamine with dimethylsulfate.

The present invention concerns as new compositions, concentrated aqueous solutions of organic compounds in which the specified quaternary ammonium alkylsulfates are employed as solubilizing agents. The invention is particularly concerned with such solutions of hydrocarbon or hydrocarbon type materals involving only one oxygen containing functional group or other functional groups present in rather minor proportions. Such solutions of olefins, are of especial interest, particularly of olefins having the olefinic bond in alpha,beta position to a carbonyl group or a nitrile group, for example, such olefins as alpha,beta unsaturated esters, amides, ketones, aldehydes, olefins and nitriles, which have demonstrated or potential utility for use in conducting hydrodimerizations by electrolytic procedures, bu such procedures as are described in my copending application Serial No. 75,130. Such solutions are also useful for conducting electrolytic polymerizations and various other polymerizations which are suitably effected in aqueous solution.

Most of such olefinic compounds useful in hydrodimerizations will be completely hydrocarbon in composition except for the specified functional groups on a carbon atom of the olefinic bond and can therefore be viewed as substituted alkenes i.e. as alpha carbamyl, cyano-, carbonyl, or carboxy-alkenes and will in general have no more than 20 or so carbon atoms. There are also included within the scope of the present invention solutions of various other organic compounds which will be useful for various other purposes described herein, for example alkanes, alkenes, arenes, including various benzene and substituted benzenes, and other aromatic compounds in general, organic acids, amines, alcohols, particularly alcohols of sufficient molecular weight to have very little water solubility, and various other organic compounds, especially those which are soluble in an amount less than 10% by weight in water, but which are rendered soluble in an amount at least 10% by weight in a water and alkylsulfate solution, preferably at least 30% by weight of such solution. It is not practical to name all of the specific organic compounds which can be dissolved and form solutions according to the procedure of the present invention, but the following are set forth as illustrative: acetyl acetone, amyl alcohol, bromonitrobenzene, o, m, p-cresols, cyclohexanol, nitrobenzene, phenylethylalcohol, furfural, and heptyl alcohol; generally of lesser solubility but still forming useful solutions with quaternary ammonium alkylsulfates according to the present invention are benzaldehyde, amylphenol, triethyl ketone, ethyl acetate and also methylene dichloride. Of course in any case where there is a question as to whether the particular organic compound is soluble in the solutions according to the present invention in the degree required for the particular application in view, the solubility can be readily determined by a simple solubility test.

The following examples are illustrative of the present invention. In the examples acrylonitrile and nitrobenzene are used as prototypes of organic materials which can be usefully dissolved in solutions of the present invention. The high solubilities obtained with nitrobenzene are particularly striking in view of the generally much lower solubility reported for other previously known hydrotropic solvents.

*Example 1*

An ammonium salt was prepared by reacting tributylamine with dimethyl sulfate as follows: A flask was charged with 74 grams of the amine and 50 ml. alcohol and 50 grams dimethyl sulfate in 50 ml. alcohol was added while the flask was cooled in an ice bath. After the reaction-mixture was stirred for about an hour with cooling, it was permitted to stand at room temperature for several days, and the salt product was then purified by successive aspirations with heat over a water bath and washings with ether. The soft, crystalline methyltributylammonium methylsulfate product weighed 129.6 grams (of which about 5 grams were probably water). A 125.6 gram amount of the product was dissolved in 14.4 grams water to give a salt solution of 89.6% concentration. A 5.12 gram amount of this salt solution dissolves more than 6.25 grams acrylonitrile, for a greater than 55% concentration of acrylonitrile. A dilution of 1.15 grams water caused no phase separation, demonstrating that a 73% salt solution could be used to prepare a 50% acrylonitrile solution. A 5.07 gram amount of the salt solution dissolved at least 5.0 grams nitrobenzene and addition of water demonstrated that a 76% salt solution could dissolve at least 45.6% nitrobenzene.

To hydrodimerize acrylonitrile a catholyte was prepared from 63.6 grams of the 89.6% methyltributylammonium methosulfate solution, 77.6 grams acrylonitrile, and 14.3 grams water, and employed in a cell using as anolyte 12 ml. 76% methyltriethylammonium p-toluenesulfonate in water and 12 ml. water. The initial pH of the catholyte was adjusted to neutrality by addition of a very small amount of a 40% aqueous solution of benzyltrimethylammonium hydroxide and a total of 1.95 ml. acetic acid was added during electrolysis to insure that only slight alkalinity developed. The electrolysis was conducted at a current of 3 amperes for about 3 hours (9 ampere-hours) at cathodic voltages of −1.87 to −1.89. Adiponitrile was then isolated from the reaction mixture.

*Example 2*

Methyltriamylammonium methylsulfate was prepared by reacting ethanolic solutions of tri-N-amylamine and dimethylsulfate. The compound was dissolved in water to form an 82.9% by weight solution and acrylonitrile was miscible in this solution.

*Example 3*

Methyltripropylammonium methylsulfate was prepared by reacting tri-N-propylamine and dimethylsulfate. The compound was dissolved in water to form an 83.4% aqueous solution which was miscible with acrylonitrile.

*Example 4*

An 87.3% aqueous solution of methyltri-N-hexylammonium methylsulfate was miscible with acrylonitrile.

*Example 5*

An 87.3% by weight solution of methyltri-N-hexylammonium methylsulfate was dissolved in water to form an 87.3% by weight solution and this solution dissolved more than an equal weight of nitrobenzene.

*Example 6*

An 86.6% by weight solution of methyltriethylammonium methylsulfate in water was prepared and was miscible with acrylonitrile.

*Example 7*

An 86.5% aqueous solution of phenyltrimethylammonium methylsulfate was miscible with acrylonitrile.

*Example 8*

An 87.3% solution of methyltri-N-hexylammonium methylsulfate in water was prepared and it proved to be miscible with dibutylmaleate.

*Example 9*

Tetramethylammonium methylsulfate was prepared by reacting trimethylamine and dimethylsulfate. The salt was a crystalline solid, melting point 227°, and was not hygroscopic; this is in sharp contrast to the methyltri-N-butylammonium methylsulfate and other higher alkyl ammonium sulfates which are exceedingly hygroscopic. The tetramethylammonium methylsulfate was dissolved in water to form an 82.3% by weight solution. This solution would dissolve amounts up to 16.1% acrylonitrile.

The concentrations in aqueous solution which can be obtained will of course vary with the particular organic material as well as with the alkylsulfate salt, and the value and suitability of the various concentrations will further vary with the intended use. The selection of the desirable salt solubilizing agent will also depend to some extent upon the intended use; for example, if the solutions are to be used in electrolytic hydrodimerization procedures, the quaternary ammonium cation of the salt should have a more negative discharge potential than that at which the contemplated hydrodimerization occurs and ammonium cations having an aryl group directly substituted on the nitrogen should be avoided.

The solutions of the present invention genreally have at least 10% by weight of their composition composed of the organic material being dissolved, and for many contemplated uses have 30% or more of their weight composed of the organic compound and often the organic compound constitutes 50% or more by weight of the solution. It will be realized of course that the reference to organic materials or organic compounds herein is with respect to only the organic materials or compounds being dissolved, and not to the quaternary ammonium salts being used as solubilizing agents. In addition to the value of particular concentrations of organic materials in aqueous systems for particular uses, it will be recognized that there is great potential value in the use of the quaternary ammonium alkylsulfates to make certain organic materials miscible with water over wider ranges of proportions.

The solutions prepared according to the present invention are useful for the various purposes discussed hereinabove with reference to the objects and purpose of the invention, and for various other purposes for which hydrotrophic systems have heretofore been employed.

What is claimed is:

1. A solution consisting essentially of water, quaternary ammonium alkylsulfate in which four hydrocarbon radicals of up to 6 carbon atoms each are attached to the ammonium nitrogen and the alkylsulfate ion contains up to 8 carbon atoms in an amount at least 30% by weight of the water and said quaternary ammonium alkylsulfate acrylonitrile dissolved therein is an amount more than 10% by weight of the solution.

2. The solution of claim 1 in which the alkylsulfate is tetraethylammonium ethylsulfate.

3. The solution of claim 1 in which the alkylsulfate is an ethylsulfate.

4. The solution of claim 1 in which acrylonitrile constitutes more than 30% by weight of the solution and the alkylsulfate is tetraethylammonium ethylsulfate.

5. A solution consisting essentially of water, a hygroscopic tetraalkyammonium methylsulfate in which each alkyl group contains up to 6 carbon atoms dissolved in an amount at least 30% by weight of the water and methylsulfate and more than 10% by weight of the solution of acrylonitrile.

6. A solution consisting essentially of water, a hygroscopic tetraalkylammonium alkylsulfate in which there are no more than 6 carbon atoms in any single radical attached to the ammonium nitrogen constituting at least 30% by weight of the water and alkylsulfate, and dissolved in said solutions more than 50% by weight of acrylonitrile.

7. The solution of claim 1 in which the acrylonitrile constitutes more than 30% by weight of the solution.

References Cited by the Examiner
UNITED STATES PATENTS

| | | | |
|---|---|---|---|
| 2,129,264 | 9/38 | Downing et al. | 260—404 |
| 2,392,585 | 1/46 | Fryling | 260—567.6 XR |
| 2,436,926 | 3/48 | Jacobson | 260—85.5 |

JULIUS GREENWALD, *Primary Examiner.*